(12) United States Patent
Zelenov et al.

(10) Patent No.: US 10,394,860 B1
(45) Date of Patent: Aug. 27, 2019

(54) ZERO KNOWLEDGE SEARCH ENGINE

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 278 days.

(21) Appl. No.: 15/360,525

(22) Filed: Nov. 23, 2016

(51) Int. Cl.
*G06F 21/44* (2013.01)
*G06F 21/60* (2013.01)
*G06F 16/31* (2019.01)
*H04L 29/06* (2006.01)
*G06F 16/93* (2019.01)
*G06F 16/951* (2019.01)

(52) U.S. Cl.
CPC ............ *G06F 16/316* (2019.01); *G06F 16/93* (2019.01); *G06F 16/951* (2019.01); *H04L 63/0428* (2013.01); *H04L 63/083* (2013.01)

(58) Field of Classification Search
CPC .................................. G06F 21/44; G06F 21/60
See application file for complete search history.

(56) References Cited

U.S. PATENT DOCUMENTS

2018/0143954 A1* 5/2018 Nakamura .......... G06F 17/2223

* cited by examiner

*Primary Examiner* — Izunna Okeke
(74) *Attorney, Agent, or Firm* — Lowenstein Sandler LLP

(57) ABSTRACT

A document manager facilitates indexing of a plurality of documents stored in a document repository by obtaining a document of the plurality of documents stored in the document repository, where the document comprises a plurality of morphemes. The document manager encodes a morpheme of the plurality of morphemes using an encryption passphrase associated with the client device to generate an encoded morpheme, encodes a location array using the encryption passphrase to generate an encoded location array, where the location array comprises each location of the morpheme within the document, and encodes a unique identifier associated with a location of the document in the document repository using the encryption passphrase to generate an encoded document identifier. The document manager then sends the encoded morpheme, the encoded location array, and the encoded document identifier to a server device to be stored in a search index.

21 Claims, 11 Drawing Sheets

ZERO KNOWLEDGE SEARCH ENGINE

TECHNICAL FIELD

Embodiments of this disclosure relate generally to computer systems and, more specifically, relate to management of search indexing of documents in computer systems.

BACKGROUND

A search engine is a computer system that is configured to search for information, either on a local network or on the Internet. Results of Internet searches can be presented via user interfaces in a list of results that may include lists of web pages, images, documents, or any other types of files. Results for document searches can be presented in a list of results that can include names of documents, storage locations of documents, text strings within documents, or the like. In some cases, search engines can mine data available for searching in databases accessible to the search engine to build an index for improving performance and quality of results. Search engine indexing collects, parses, and stores data to facilitate information retrieval.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Figure 1:
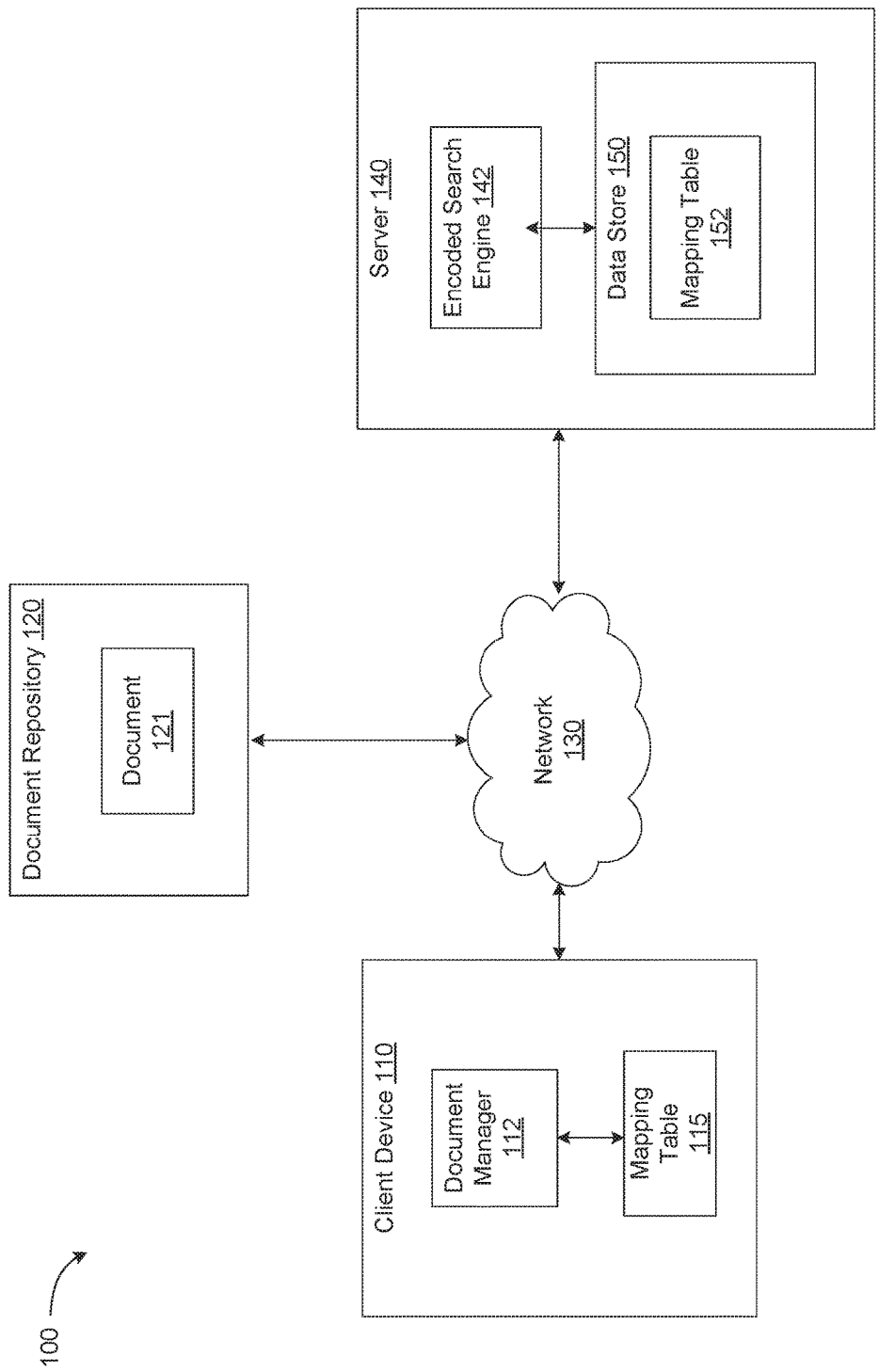
FIG. 1 is a block diagram illustrating a networked environment in which embodiments of the present disclosure may be implemented.

Described herein are methods and systems for enabling and implementing a zero knowledge search engine for client devices. Search engines may collect information by accessing data from websites, document repositories, etc., and parsing that data to build a search index. Indexing this data can typically involve associating words, morphemes, or other definable tokens found in documents to document locations, uniform resource locators (URLs), domain names, or other similar information. Additionally, the content of documents may be parsed, examined, and stored by a search engine to facilitate more meaningful search results. The associations between document locations, document content, and search terms may be stored in databases that are maintained by third parties, and in many cases are available to the public. While storing this information can facilitate efficient searching and provide accurate results, it can also grant third parties access to personal data or corporate proprietary data without restriction. Excluding private data from search engines can make the document and its contents more difficult to find. Similarly, encrypting the data prior to providing it to a search engine can significantly limit the search engine's effectiveness if it is not able to index a document's contents.

Aspects of the present disclosure address the above noted and other deficiencies by providing a document manager on a client device to facilitate indexing of documents for an encoded or "zero knowledge" search engine on a server. In one embodiment, a document manager application can facilitate indexing of documents stored in a document repository by obtaining a document from the document repository, parsing the document to identify its textual content, examining the textual content to determine the morphemes within the content, and encoding the morphemes, a unique identifier associated with the document's location, and information that identifies the location(s) of each morpheme within the document with a passphrase that is associated with the client device. The encoded information is sent to an encoded search engine on a server for use in subsequent searches.

The document manager may then receive a search query and parse that search query to identify the morphemes within the query, encode the morphemes using the same passphrase used to encode the document content, and send the encoded search morphemes to the encoded search engine. The encoded search engine may then access its index mapping table to identify any documents that have been previously encoded where the morphemes are present in the document content in the particular order listed in the search query. Any results matching the query may be sent back to the document manager on the client device to be further processed or displayed to the user.

Aspects of the present disclosure are thus capable of providing secure search engine capabilities for document indexing of documents stored in document repositories without requiring that the unencrypted content be sent to the search engine. Thus, the search engine can function with "zero knowledge" (i.e., without having any knowledge) of document contents, document location, or even the meaning of the terms in received search requests. This can provide the benefits of search engine capability, while significantly improving security of document content. In particular, unlike conventional techniques, the encoded search engine of the present disclosure prevents exposure of unencrypted personal data or corporate proprietary data to third parties without excluding such private data from search engines and without encrypting the data prior to identifying associations between morphemes and their locations in the data. The encoded search engine of the present disclosure can also facilitate searching for document content across multiple document repositories, which can improve efficiency of a user's interaction with document management systems, significantly reducing or eliminating the need for a user to interact with different document repositories separately.

FIG. 1 is a block diagram illustrating a networked environment 100 in which embodiments of the present disclosure may be implemented. The networked environment 100 can include one or more client devices 110, one or more servers 140, and one or more document repositories 120, which can be in data communication with each other via network 130. Computer system 1100 illustrated in FIG. 11 may be one example of any of client devices 110 or servers 140. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 110 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In one embodiment, client device 110 includes a document manager 112 and mapping table 115.

Document manager 112 may manage the parsing, encoding, and searching of documents stored in document repositories 120 in order to facilitate a zero knowledge search provided by encoded search engine 142. In some implementations, document manager 112 may be a software application that can be installed on client device 110, and invoked by a user. The user may then interact with the document manager 112 via a graphical user interface to initiate indexing of documents stored in a document repository 120, and subsequently initiate searches of the indexed documents.

Client device 110 may communicate with one or more document repositories 120 that may store documents (e.g., documents 121) for a user of the client device. In some implementations, document repository 120 may be a local document storage system within local area network. For example, document repository may be a file system accessible via a network attached storage (NAS) system, a shared network directory 120, or the like. In some implementations, document repository 120 may be a cloud based document storage system that is accessible to client device 110 via the Internet. For example, document repository 120 may be Dropbox®, Google Drive®, Apple's iCloud Drive®, Amazon Drive®, or any other similar cloud-based storage system. Although, for simplicity, only one document repository 120 is depicted, in some embodiments client device 110 may communicate with multiple document repositories 120.

Documents 121 may be any type of document that includes text that may be indexed for a search engine. For example, documents 121 may be a word processing document, a presentation document, a spreadsheet, an image that has been processed by optical character recognition (OCR) to embed text with the image, a markup document (e.g., hypertext markup language (HTML), extensible markup language (XML), etc.), or the like. In various implementations, the text within documents 121 may include multiple words, which in turn may be made up of multiple morphemes. A morpheme is the smallest grammatical unit of a language. Thus, a word may be made up of a single morpheme, or alternatively, may be made up of multiple morphemes. For example, the word "perish" is made up of a single morpheme, while the word "nonperishable" is made up of multiple morphemes ("non," "perish," and "able").

In an illustrative example, document manager 112 can initiate the indexing of documents 121 stored on document repository 120. In some implementations, document manager 112 may present a user interface on client device 110 that may be used by a user to initiate the indexing of documents 121 stored on document repository 120. Alternatively, a component of document manager 112 may execute independently of a user interface as a background task of client device 110 to monitor the contents of document repository 120 and initiate indexing of a new document added to the repository, an existing document that is modified, or the like.

Document manager 112 may obtain a document from document repository 120 and load the document into a memory space of client device 110 for processing. Alternatively, document manager 112 may load the document into temporary storage on the client device 110. Once the document has been obtained, document manager 112 may then parse the document to extract the textual content from the document, determine the morphemes within the textual content, and determine the locations of the morphemes within the textual content to generate a location array for each morpheme. In some implementations a location array may be a binary vector of values that represent the position of the morpheme within the document. For example, a document that includes the single line of text "New York City is new" may be parsed to extract the morphemes "new," "york," and "city". The morpheme "new" is located at position 1 and position 5. Thus, a location array for the morpheme "new" may be represented as the binary vector "10001", where the value "1" indicates the location of that morpheme within the text.

Once all morphemes in the document are identified, document manager 112 may encode each morpheme using an encryption passphrase that is associated with the client device 110 to generate an encoded morpheme. In some implementations, the passphrase may be provided by a user of the device so that all of the user's documents are encoded with the same passphrase. In other implementations, the passphrase may be associated with the client device 110 (e.g., associated with the serial number, a unique device identifier, etc.) so that any document processed by the device can use the same passphrase. In some implementations, each morpheme may be encoded using homomorphic encryption. Homomorphic encryption is a form of encryption that allows computations to be carried out on encoded text to generate an encrypted result which, when decrypted, matches the result of that operation if performed on the unencrypted text.

Document manager 112 may additionally encode the location array for each morpheme using the same encryption method and encryption passphrase to generate an encoded location array. Document manager 112 may then also encode a unique identifier associated with the location of the document in the document repository using the encryption method and passphrase to generate an encoded document identifier. In some implementations, the unique identifier may indicate the storage repository 120 that stores the document. Additionally, the unique identifier may indicate the location within the storage repository where the document is stored (e.g., the directory structure within the filesystem of document repository 120). For example, the unique identifier may include a uniform resource locator address (URL) of the document within document repository 120. In one embodiment, the unique identifier may be a hash value of the location information, which may then be encoded to generate an encrypted hash value. In some implementations, document manager may store the unique identifier and the associated document location in mapping table 115.

Document manager 112 may then send the encoded morpheme, the encoded location array, and the encoded document identifier to server 140 to be stored in a search index on server 140. In one embodiment, once the encoded information has been successfully sent to server 140, document manager 112 may remove the obtained document from the memory space. For example, responsive to receiving a notification from server 140 that the encoded information has been stored, document manager 112 may remove the document from the memory space.

Subsequently, document manager 112 may receive a search query that includes one or more words to be used to search the documents stored in document repository 120. In some implementations, the search query may be received from the user interface presented by document manager 112. Document manager may then determine the morphemes associated with the words in the search query, encode the morphemes using the same encryption method and passphrase used to encode the morphemes from the documents obtained from document repository 120, and send the encoded morphemes of the search query to the server 140. In some implementations, document manager 112 may additionally determine an order of the morphemes within the search query and send that order to the server device with the encoded morphemes so that the server 140 may process the morphemes of the search query in the proper order. Document manager 112 may then receive results of the search query from server 140 and provide the results to the user. In some embodiments, document manager 112 may provide the results for display via the user interface. Document manager 112 is described in further detail below with respect to FIG. 2.

Server 140 may include, for example, a server computer or any other system providing computing capability. Alternatively, server 140 may employ a plurality of computing devices that may be arranged, for example, in one or more server banks or computer banks or other arrangements. Such computing devices may be positioned in a single location or may be distributed among many different geographical locations. For example, server 140 may include a plurality of computing devices that together may comprise a hosted computing resource, a grid computing resource and/or any other distributed computing arrangement. In some cases, server 140 may correspond to an elastic computing resource where the allotted capacity of processing, network, storage, or other computing-related resources may vary over time.

In some implementations, server 140 can include an encoded search engine 142 and a data store 150. Encoded search engine 142 can communicate with document manager 112 of client device 110 to provide zero knowledge search capability for documents stored in document repository 120. In some implementations, encoded search engine 142 may receive encoded information from document manager 112 pertaining to the documents stored in document repository 120 and store the encoded information in mapping table 152. Subsequently, encoded search engine 142 may receive a search request from document manager 112 that includes encoded morphemes in a particular order. Encoded search engine 142 may then use the information in mapping table 142 to provide search results without decoding the encoded morphemes in the search request and without decoding the location or other identifying characteristics of documents in document repository 120.

In some implementations, server 140 can include a data store 150 which may store mapping table 152. Data store 150 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Mapping table 152 may be a data structure that stores entries that are each associated with encoded information received from document manager 112. Mapping table 152 may include multiple entries, each associated with a single morpheme of a document processed by document manager 112. As noted above, document manager 112 may send an encoded morpheme, an encoded document identifier associated with the encoded morpheme, and an encoded location array that includes each occurrence within a document of the morpheme associated with the received encoded morpheme. Encoded search engine 142 may then store this information as a reverse index in the mapping table to facilitate search requests for an encoded morpheme.

Each entry in the mapping table can map a stored encoded morpheme received from document manager 112 to a stored encoded document identifier of an associated document (e.g., a document stored in document repository 120), and can indicate a location of the stored encoded morpheme within the associated document. As noted above, in some implementations, the stored encoded morpheme, the stored encoded document identifier, and the location information (e.g., a stored encoded location array) were encoded using the encryption method and passphrase associated with the client device 110.

In an illustrative example, encoded search engine 142 can receive a search request from document manager 112. The search request can include multiple received encoded morphemes in a particular order, and encoded search engine 142 may facilitate searching indexed documents that include at least one occurrence of the received encoded morphemes in the particular order. Encoded search engine 142 may perform the search by searching the mapping table 152 for entries where the stored encoded morpheme in the table entry matches the received encoded morpheme of the request, and select those entries that map to the same encoded document identifier and where the locations of the stored encoded morphemes in the associated documents match the particular order of the received encoded morphemes of the search request. In some implementations, encoded search engine 142 may determine that the stored encoded morphemes are included in a document in the particular order by performing mathematical computations on the stored encoded location arrays associated with the stored encoded morphemes. As noted above, the encoded information may be encoded using homomorphic encryption, which allows computations to be carried out on the encoded items to generate an encrypted result which, when decrypted, matches the result of that operation if performed on the unencrypted text.

Once an encoded document identifier that includes encoded morphemes in that particular order has been identified, encoded search engine 142 may send the encoded document identifier and the locations of the stored encoded morphemes in the document to document manager 112 in response to the search request. Encoded search engine 142 is described in further detail below with respect to FIG. 3.

Figure 2:
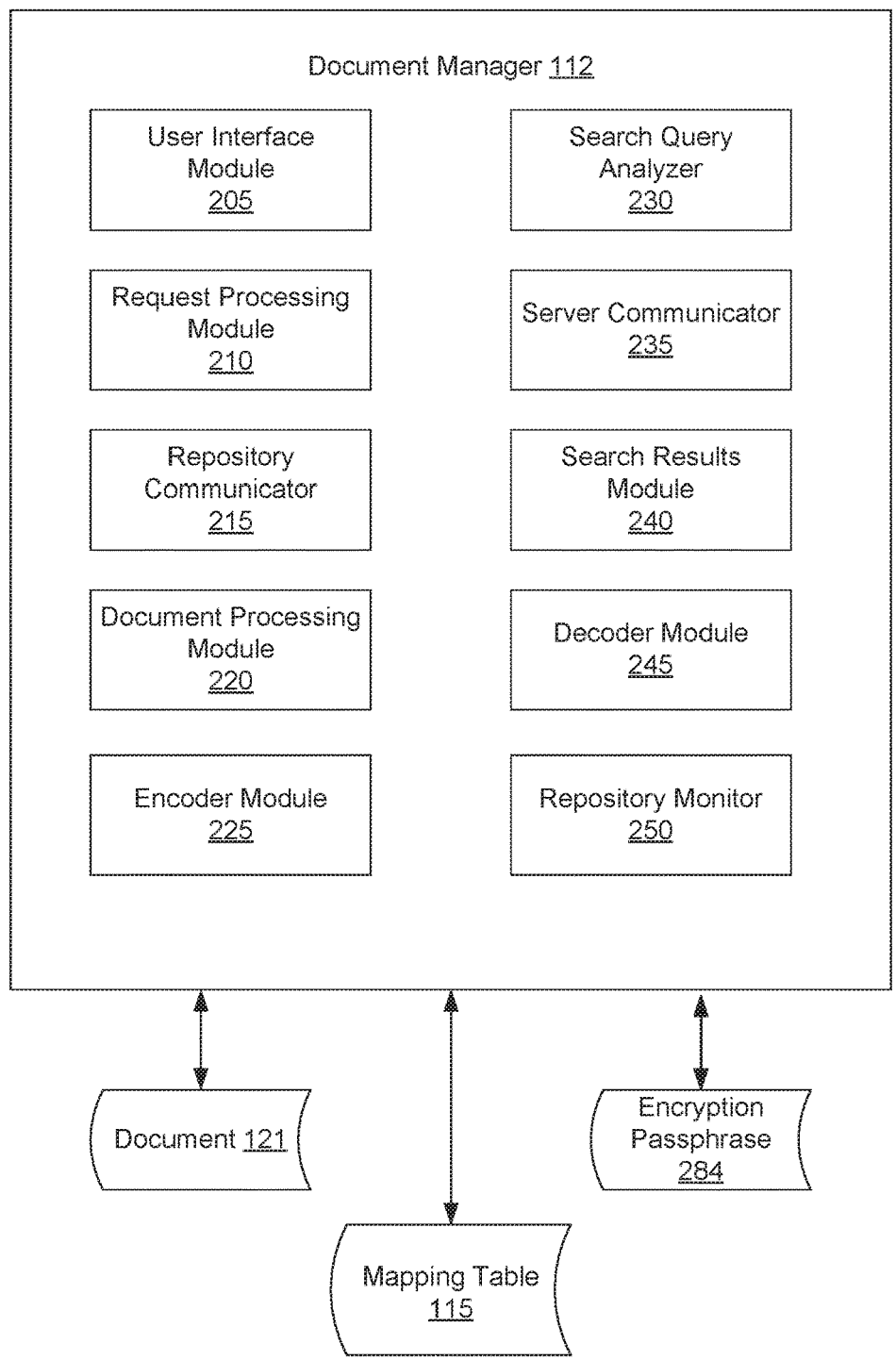
FIG. 2 is a block diagram illustrating a document manager, according to an embodiment.

FIG. 2 is a block diagram of one embodiment of a document manager 112 showing logical modules that may be loaded into and executed by a processing device of client device 110. In one embodiment, document manager 112 corresponds to document manager 112 of FIG. 1. In some implementations, document manager 112 can include user interface module 205, request processing module 210, repository communicator 215, document processing module 220, encoder module 225, search query analyzer 230, server communicator 235, search results module 240, decoder module 245, and repository monitor 250. This arrangement of modules and components may be a logical separation, and in other embodiments, these modules or other components can be combined together or separated in further components.

In an illustrative example, document manager 112 may invoke user interface module 205 to present a user interface for display by a client device (e.g., client device 110 of FIG. 1). The user interface may be a window, a dialog box, a prompt for textual input, or the like. A user may enter a request to index one or more documents (e.g., documents 121) that the user has stored in a document repository, which can cause the user interface module 205 to invoke request processing module 210 to process the request and begin indexing the document. Alternatively, document indexing may be performed independently of user interface module 205. For example, repository monitor 205 may monitor the contents of a document repository and initiate indexing of a new document added to the repository, an existing document that is modified, or the like. Alternatively, repository monitor 205 may receive a notification from the document repository that a document has been modified, and subsequently send a request to the document repository to retrieve the document.

Request processing module 210 may receive information from the user via the user interface to enable document manager 112 to index the documents of a document repository. For example, request processing module 210 may receive the login credentials of the user for the document repository to grant document manager 112 the authority to access the documents stored there. Request processing module 210 may then invoke repository communicator 215 to obtain access to the specified repository using the received credentials, and download a document to be indexed. In one embodiment, the user may additionally specify the document to be indexed in the request. In another embodiment, repository communicator 215 may begin downloading documents based on user defined configuration. For example, repository communicator 215 may obtain the most recently added document, the most recently updated document, or the like. Once obtained, repository communicator 215 may load the document into a memory space (or temporary storage space) of client device 110 and invoke document processing module 220 to process the document.

Document processing module 220 may parse the document to extract textual content, where the textual content is made up of multiple words. Document processing module 220 may then determine the morphemes in the document from the words within the textual content, identify each occurrence of each morpheme within the textual content, and determine the location of each morpheme within the textual content to generate a location array for each morpheme. As noted above, a location array may be a binary vector of values that represent the position of the morpheme within the document. For example, a document that includes the single line of text "New York City is new" may be parsed to extract the morphemes "new," "york," and "city". The morpheme "new" is located at position 1 and position 5. Thus, a location array for the morpheme "new" may be represented as the binary vector "10001", where the value "1" indicates the location of that morpheme within the text at the corresponding position. Similarly, a location array for the morpheme "york" may be represented as the binary vector "01000", and a location array for the morpheme "city" may be represented as the binary vector "00100". In some implementations the morpheme "is" may be disregarded as non-essential for the purposes of indexing.

Once the morphemes in the document have been identified, document processing module 220 may then invoke encoder module 225 to encode each identified morpheme to generate a corresponding encoded morpheme. Encoder module 225 may encode each morpheme using an encryption passphrase 284 associated with the client device. In some implementations, the encryption passphrase may be provided by the user via the user interface and stored on the client device. Alternatively, encoder module 225 may determine the passphrase based on an attribute of the client device (e.g., the device serial number, a user sign on credential, a unique device identifier, etc.). As noted above, encoder module 225 may encode each morpheme using homomorphic encryption to allow computations to be carried out on the encoded items. Encoder module 225 may additionally encode the location array for each morpheme using the same homomorphic encryption method and encryption passphrase to generate an encoded location array that corresponds to the encoded morpheme.

Document processing module 220 may additionally generate a unique identifier associated with the location of the document in the document repository. In some implementations, the unique identifier may indicate the storage repository that stores the document. For example, the unique identifier may include a uniform resource locator address (URL) of the document repository, the Internet Protocol (IP) address of the document repository, or other similar identifying information. Additionally, the unique identifier may indicate the location within the storage repository where the document is stored (e.g., the directory structure within the filesystem of document repository). In one embodiment, in order to store the location information as a fixed length, document processing module may generate the unique identifier as a hash value of the location information. In some implementations, document processing module 220 may store the unique identifier and the associated document location information in a local mapping table 115 to be used when conducting future searches of the document. Document processing module 220 may then invoke encoder module 225 to encode the unique identifier associated with the location of the document using the encryption passphrase 284 to generate an encoded document identifier.

Thus, each encoded morpheme for a document can be associated with the same encoded unique identifier. Each encoded morpheme, however, should be associated with a different corresponding encoded location array since each encoded morpheme should occur in different locations of the document, thus would be represented with different binary vectors. Using the "New York City is new" example from above, three encoded morphemes could be generated ("new," "york," and "city") each associated with the same encoded unique identifier representing the same document (e.g., the same encoded hash value of the document location), but each also associated with different encoded binary vectors representing the locations of the morphemes within the document.

Server communicator 235 may then be invoked to send the encoded morpheme, the encoded location array, and the encoded document identifier to a server to be stored in a search index on the server. Once the encoded information has been successfully sent to the server, document processing module 220 may remove the obtained document from the memory space. For example, responsive to receiving a notification from the server that the encoded information has been stored, server communicator 235 may invoke document processing module 220 to remove the document from the memory space.

A user may subsequently initiate a search of the documents previously indexed for search strings entered into the user interface. User interface module 205 may receive a search query entered by the user that includes one or more words to be used to search the documents stored in the document repository (and indexed by the server), and invoke request processing module 210 to process the query. Search query analyzer 230 may be invoked to parse the query and determine one or more morphemes associated with the words in the search query. Using the "New York City" example from above, a user may subsequently enter a search query "new york" into the user interface. Search query analyzer 230 may parse the string to determine the two morphemes of the query ("new" and "york"). Encoder module 225 may then be invoked to encode the morphemes from the search query using the encryption passphrase 284 to generate corresponding encoded search morphemes. Server communicator 235 may then be invoked to send the encoded search morphemes to the server. In some implementations, search query analyzer may additionally determine an order of the morphemes within the search query and send that order to the server device with the encoded search morphemes so that the server may process the encode search morphemes in the proper order of the search query.

Once the server has completed processing the search query, server communicator 235 may receive a response from the server and invoke search results module 240 to process the results. If the sever identified a document that included the encoded search morphemes in the proper order, search results module 240 may receive an encoded document identifier that is associated with the encoded search morphemes. For example, the submitted search query "new york" may result in receiving the encoded document identifier for the document described above that includes the "New York City is new" text since the morphemes from the search query may be located in that document. In some implementations, if multiple documents are identified as including the encoded search morphemes in the proper order, search results module 240 may receive multiple encoded document identifiers. Decoder module 245 may be invoked to decode the encoded document identifier (or identifiers) using encryption passphrase 284. The decoded document identifier may then be used to access an entry in mapping table 115 to identify the location of the corresponding document in the document repository. As noted above, this may be the URL of the repository, the URL of the document location within the repository, or the like.

Search results module 240 may then invoke user interface module 205 to provide the location of the document for display via the user interface on the client device. In some implementations, information identifying the document name and location may be provided to the user without detailing the location of the morphemes within the document. Alternatively, search results module 240 may additionally receive location information for the encoded search morphemes from the server. The server may send the encoded location array for each of the encoded search morphemes, which search results module 240 may then decode and use to provide the locations of the morphemes to the user interface. In some implementations the server may send a combined encoded location array that includes the locations of the encoded search morphemes in the order of the search request. In other words, rather than receiving a location array for "new" and a location array for "york", search results module 240 may receive a single location array for "new york" includes the locations of "new york" within the document.

Search results module 240 may then provide a listing of the locations of the morpheme to present to the user via the user interface. Alternatively, search results module 240 may invoke repository communicator 215 to download the document from the document repository using the location information in mapping table 115. Once downloaded, user interface module 2015 may be invoked to present the document to the user, access the received location array of the search results, and highlight the occurrence of the morphemes within the document.

Figure 3:
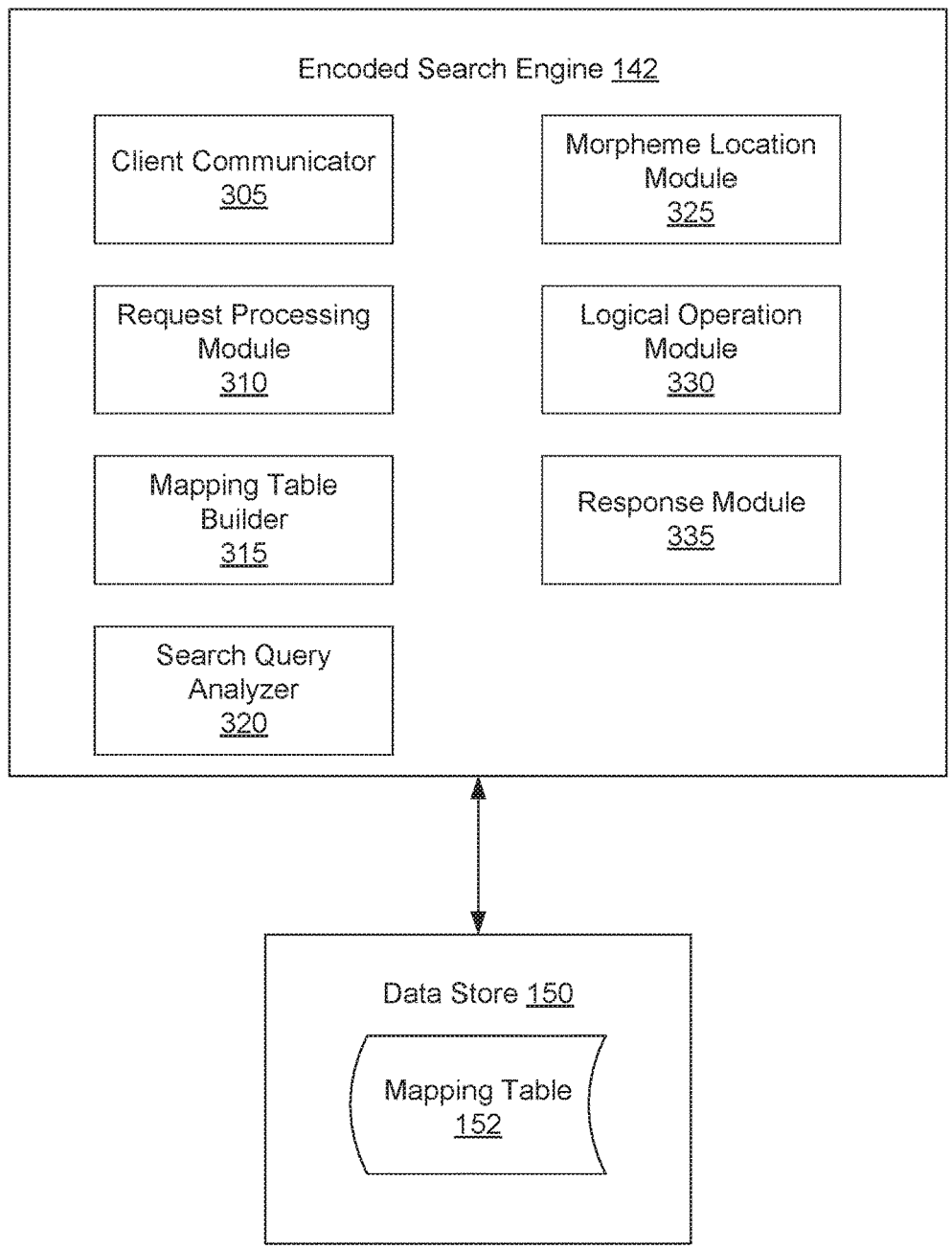
FIG. 3 is a block diagram illustrating an encoded search engine, according to an embodiment.

FIG. 3 is a block diagram of one embodiment of an encoded search engine 142 showing logical modules that may be loaded into and executed by a processing device of server device. In one embodiment, encoded search engine 142 corresponds to encoded search engine 142 of server 140 of FIG. 1. In some implementations, encoded search engine 142 can include user client communicator 305, request processing module 310, mapping table builder 315, search query analyzer 320, logical operation module 325, and response module 330. This arrangement of modules and components may be a logical separation, and in other embodiments, these modules or other components can be combined together or separated in further components. In some implementations, the components of encoded search engine 142 may be included on a single server (e.g., server 140 of FIG. 1). Alternatively, the components of encoded search engine 142 may be divided across multiple servers.

In some implementations, data store 150 may be connected to encoded search engine 142, and can include mapping table 152. In one embodiment, a single server (e.g., server 140 of FIG. 1) may include encoded search engine 142 and data store 150. In another embodiment, data store 150 may be on a different server from that of encoded search engine 142, and may be connected over a network or other connection.

In an illustrative example, encoded search engine 142 may maintain mapping table 152 that includes entries that are each associated with encoded information received by a document manager of a client device (e.g., document manager 112 of FIGS. 1-2). Mapping table 152 may include multiple entries, each associated with a plurality of encoded morphemes of a document processed by document manager 112. Each entry in the mapping table indicates a location of a stored encoded morpheme in the document and maps the stored encoded morpheme to a stored encoded document identifier of the document. As noted above, each stored encoded morpheme and stored encoded document identifier in the mapping table were encoded using the encryption passphrase associated with a client device.

To maintain the mapping table 152, the encoded information is received by encoded search engine 142 from a client device, indexed, and stored for later use to facilitate processing search requests for encoded morphemes from the client device. Client communicator 305 may receive a request from a client device to add encoded information to the mapping table, and subsequently invoke request processing module 310. Request processing module 310 may receive from the client device an encoded morpheme, an encoded document identifier associated with the encoded morpheme, and an encoded location array that includes each occurrence within the document of the morpheme associated with the encoded morpheme. Mapping table builder 315 may then be invoked to generate a mapping table entry to store the encoded information. In some implementations, the encoded information may be stored directly in the mapping table entry. Alternatively, the encoded information may be stored in the data store and the mapping table entry may include references to the stored information.

Subsequently, encoded search engine 142 may receive a search request for an encoded document identifier from the client device, where the search request includes received encoded morphemes in a particular order. Search query analyzer 320 may then be invoked to identify encoded document identifiers for documents that include at least one occurrence of the received encoded morphemes in the particular order of the query. Search query analyzer 320 may then search mapping table 152 for entries where the stored encoded morpheme in the table entry matches one of the received encoded morphemes of the request, and select those entries that map to the same encoded document identifier.

For example, a search request that includes two received encoded morphemes can cause search query analyzer 320 to search mapping table 152 for entries where the stored encoded morpheme matches either the first received encoded morpheme of the request or the second received encoded morpheme of the request, and where those entries map to the same stored encoded document identifier (e.g., the entries associated with encoded morphemes within the same document). Referring to the "New York City" example described above, a user that enters a search query of "New York" may send two encoded morphemes (one for "new" and one for "york") to encoded search engine 142. Search query analyzer may receive a first received encoded morpheme (representing "new") and a second received encoded morpheme (representing "york"), and subsequently search the mapping table for stored encoded morphemes that match the first and second received encoded morphemes, and that are associated with the same encoded document identifier.

In some implementations, search query analyzer 320 may additionally take into account the order of the received encoded morphemes in the search request, selecting those stored encoded morphemes where the locations of the stored encoded morphemes match the order of the received encoded morphemes in the search request. For example, after receiving a search request that includes the received encoded morphemes for "new" and "york", where the received encoded morpheme for "new" occurs before the received encoded morpheme for "york", search query analyzer 320 will select those mapping table entries where the locations of the stored encoded morphemes within an identified document match the order of the search request (e.g., documents that include "new york").

Morpheme location module 325 may be invoked to determine whether the locations of the stored encoded morphemes match the order of the received encoded morphemes in the search query. Morpheme location module 325 may determine the encoded location arrays associated with the identified stored encoded morphemes that are mapped to the same stored encoded document identifier. Morpheme location module 325 may then determine, using the stored encoded location arrays that the locations of the stored encoded morphemes match the order of the received encoded morphemes in the search request. Referring to the "new york" example above, morpheme location module 325 may determine the stored encoded location array for the stored encoded morpheme for "new", and determine the stored encoded location array for the stored encoded morpheme for "york", where the mapping table entries for these two stored encoded morphemes map to the same stored document identifier. Then, morpheme location module 325 may use the stored encoded location arrays to determine if "new" and "york" appear as "new york" anywhere in that document.

In some implementations, morpheme location module 325 may determine that the stored encoded morphemes occur with the document associated with the encoded document identifier by invoking logical operation module 330 to perform a logical operation on the encoded location arrays. As noted above, since the encoded items were encoded using homomorphic encryption, logical computations may be performed on the encoded items to generate an encrypted result that matches the result of the same computation performed on the unencrypted data.

In one embodiment, where two received encoded morphemes are present in the search request, logical operation module 330 may perform a logical shift operation on the second stored encoded location array (e.g., the stored location array for the stored encoded morpheme that matches the second received encoded morpheme) to generate a modified encoded location array. Logical operation module 330 may then perform a logical "AND" operation on the modified location array and the first stored encoded location array (e.g., the stored encoded location array for the stored encoded morpheme that matches the first received encoded morpheme) to generate a result vector. A logical "AND" operation, or logical conjunction operation, may be used for bitwise operations against two binary vectors to generate a result vector where a value in the result vector is "true" (e.g., the binary value set to "1") if and only if the corresponding values in both the input vectors are true (e.g., both input values are "1"). Logical operation module 330 may then determine that the result vector comprises a result value that indicates that the locations of the first stored encoded morpheme and the second stored encoded morpheme match the order of the received encoded morphemes in the search request.

Referring to the "New York City is new" example above, logical operation module 330 may determine the stored encoded location array for the stored encoded morpheme "new" (e.g., the encoded binary vector "10001"), and the stored encoded location array for the stored encoded morpheme "york" (e.g., the encoded binary vector "01000"). Since the received encoded morpheme for "york" occurs after the received encoded morpheme for "new" in the search request, logical operation module 330 may perform a logical shift operation on the stored encoded location array for "york", generating a modified encoded location array (e.g., an encoded binary vector "1000T" where T is trash value that is not used for subsequent calculations). Logical operation module 330 can then perform a logical "AND" operation on the stored encoded location array for "new" and the modified encoded location array (the shifted location array) for "york" to generate a result vector (e.g., an encoded binary vector "1000T"). The example result vector includes a single "1", which indicates that there is a single occurrence of the encoded morpheme for "new" and the encoded morpheme for "york" in that particular order within the document that only includes the text string "New York City is new".

Although, for simplicity, the above example illustrates a search request with two morphemes and a document that includes a single sentence of five words, it should be noted that aspects of the present disclosure may be applied to search requests that include any number of morphemes as well as for documents that include any number of words.

Subsequently, response module 335 may be invoked to send a response to the client device. In some implementations, response module 335 may send to the client device only the encoded document identifier that includes the stored encoded morphemes in the same order as the requested encoded morphemes from the search request. In other implementations, response module 335 may additionally send the locations of the stored encoded morphemes within the identified document. In these implementations, response module 335 may send the stored encoded location arrays of each stored encoded morpheme so that the document manager application may provide the location of each occurrence of the individual morphemes within the document. Alternatively, response module 335 may provide the result vector generated by logical operation module 330 so the document manager application may provide the locations of each occurrence of the morphemes that match the order of the morphemes in the search request.

FIGS. 4-10 are flow diagrams of various implementations of methods related to a zero knowledge search engine. The methods are performed by processing logic that may include hardware (circuitry, dedicated logic, etc.), software (such as is run on a general purpose computer system or a dedicated machine), or a combination of both. Some methods may be performed by a document manager of a client device such as document manager 112 of FIGS. 1-2. Some methods may be performed by an encoded search engine on a server such as encoded search engine 142 of FIGS. 1 & 3.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 4:
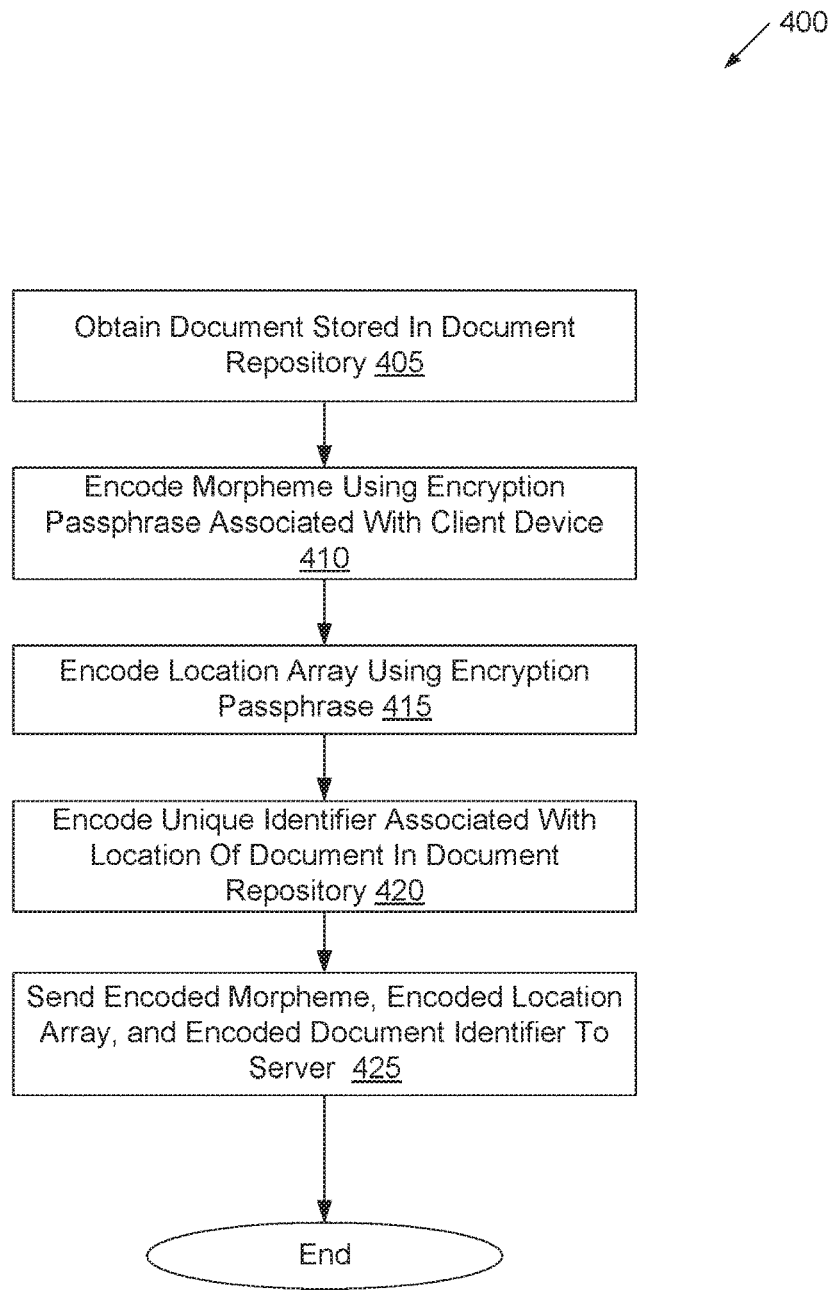
FIG. 4 is a flow diagram illustrating a method of facilitating indexing of a plurality of documents stored in a document repository, according to an embodiment.

FIG. 4 is a flow diagram illustrating an embodiment for a method 400 of facilitating indexing of a plurality of documents stored in a document repository. Method 400 may be performed, for example, by a document manager. At block 405 of method 400, processing logic obtains a document of the plurality of documents stored in the document repository, where the document is made up of a plurality of morphemes. At block 410, processing logic encodes a morpheme of the plurality of morphemes using an encryption passphrase associated with the client device to generate an encoded morpheme.

At block 415, processing logic encodes a location array using the encryption passphrase to generate an encoded location array. In some implementations, the location array may comprise each location of the morpheme within the document. At block 420, processing logic encodes a unique identifier associated with a location of the document in the document repository using the encryption passphrase to generate an encoded document identifier. At block 425, processing logic sends the encoded morpheme, the encoded location array, and the encoded document identifier to a server device to be stored in a search index. After block 425, the method of FIG. 4 terminates.

Figure 5:
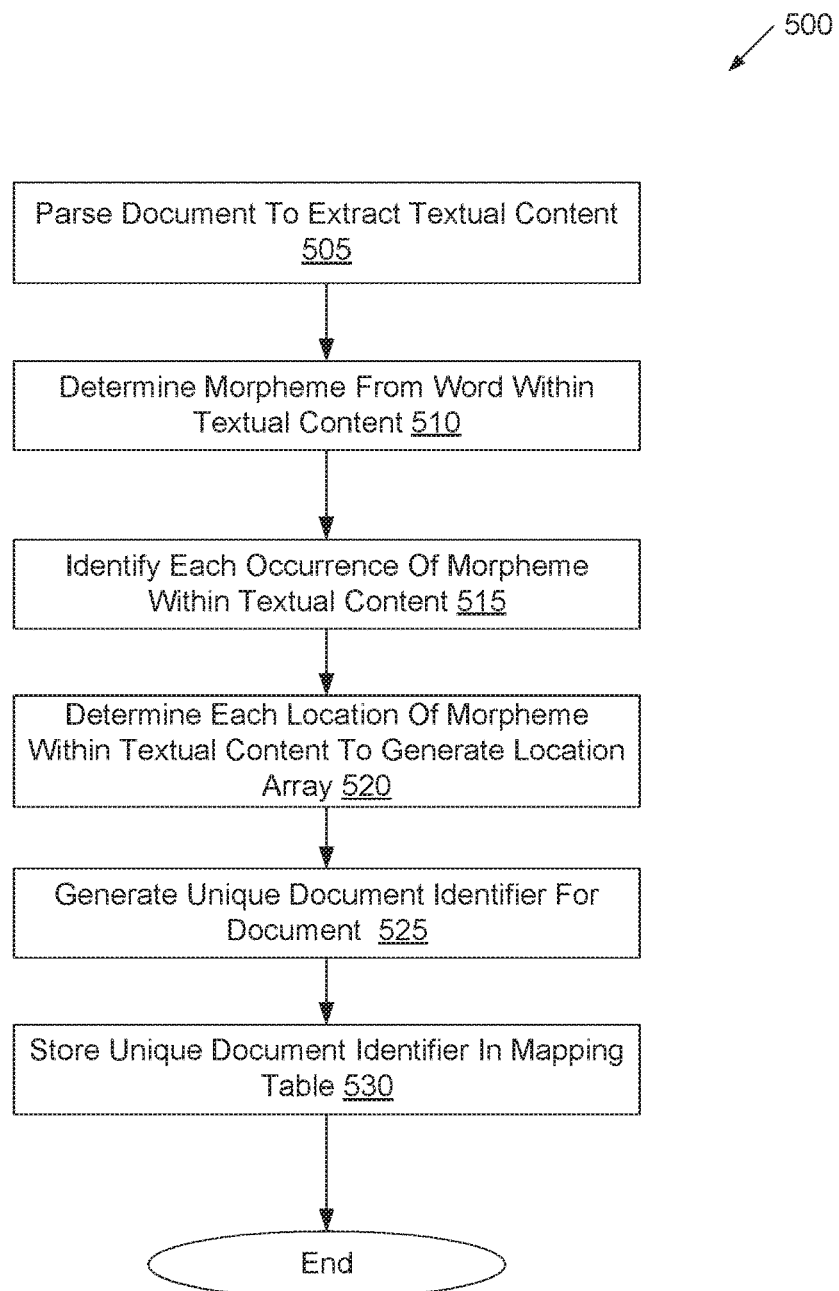
FIG. 5 is a flow diagram illustrating a method of extracting information from a document for encoding on a client device, according to an embodiment.

FIG. 5 is a flow diagram illustrating an embodiment for a method 500 of extracting information from a document for encoding. Method 500 may be performed, for example, by a document manager. At block 505 of method 500, processing logic parses a document to extract textual content from the document, where the textual content comprises a plurality of words. At block 510, processing logic determines a morpheme from a first word of the plurality of words within the textual content. At block 515, processing logic identifies each occurrence of the morpheme within the textual content.

At block 520, processing logic determines each location of the morpheme within the textual content to generate the location array for the morpheme. At block 525, processing logic generates a unique document identifier associated with the location of the document. At block 530, processing logic stores the unique document identifier in a mapping table that maps the unique document identifier to the location of the document. After block 530, the method of FIG. 5 terminates.

Figure 6:
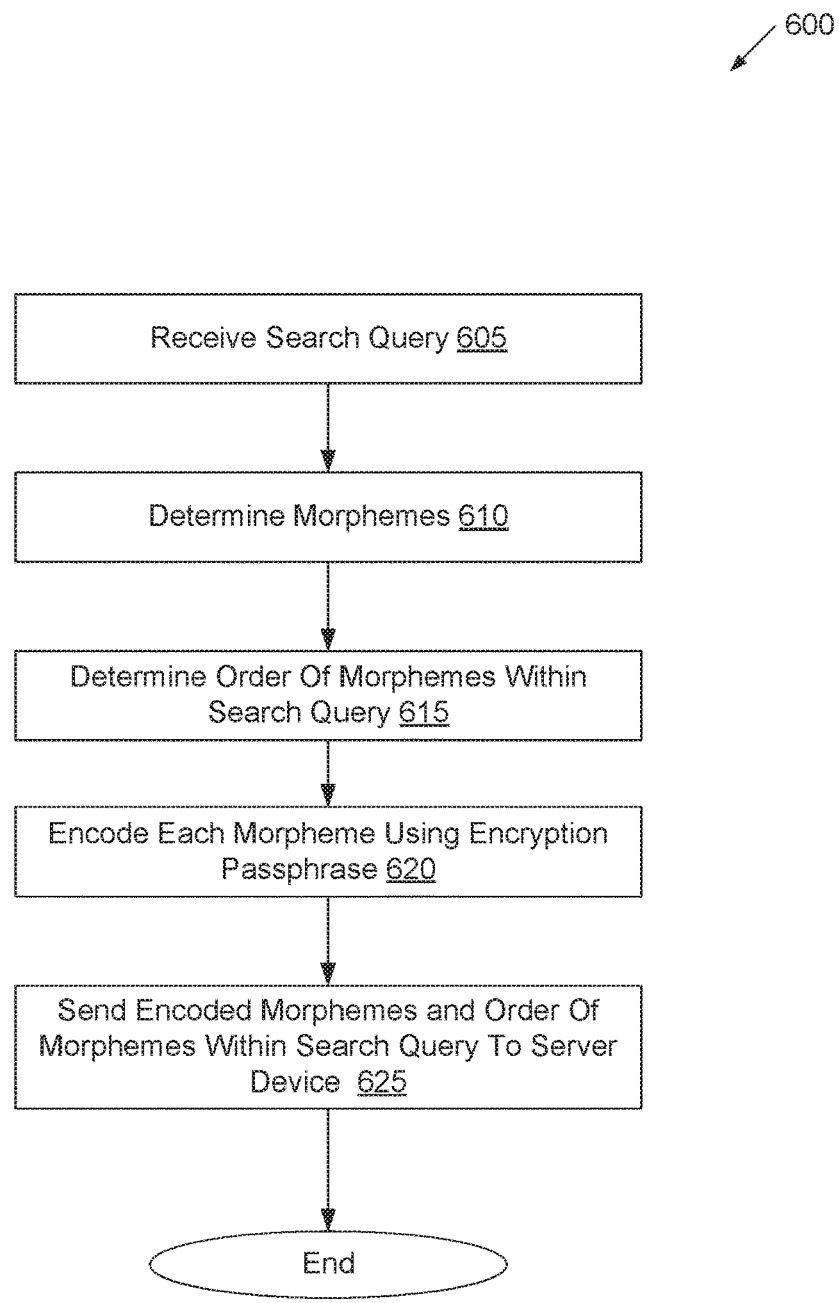
FIG. 6 is a flow diagram illustrating a method of processing a search query on a client device for sending to an encoded search engine, according to an embodiment.

FIG. 6 is a flow diagram illustrating an embodiment for a method 600 of processing a search query on a client device for sending to an encoded search engine. Method 600 may be performed, for example, by a document manager. At block 605 of method 600, processing logic receives a search query comprising one or more words, the search query to be used to search documents stored in the document repository. At block 610, processing logic determines one or more morphemes associated with the one or more words. At block 615, processing logic determines an order of the one or more morphemes within the search query. At block 620, processing logic encodes each of the one or more morphemes using the encryption passphrase to generate one or more encoded morphemes. At block 625, processing logic sends the one or more encoded morphemes and the order of the one or more morphemes within the search query to the server device. After block 625, the method of FIG. 6 terminates.

Figure 7:
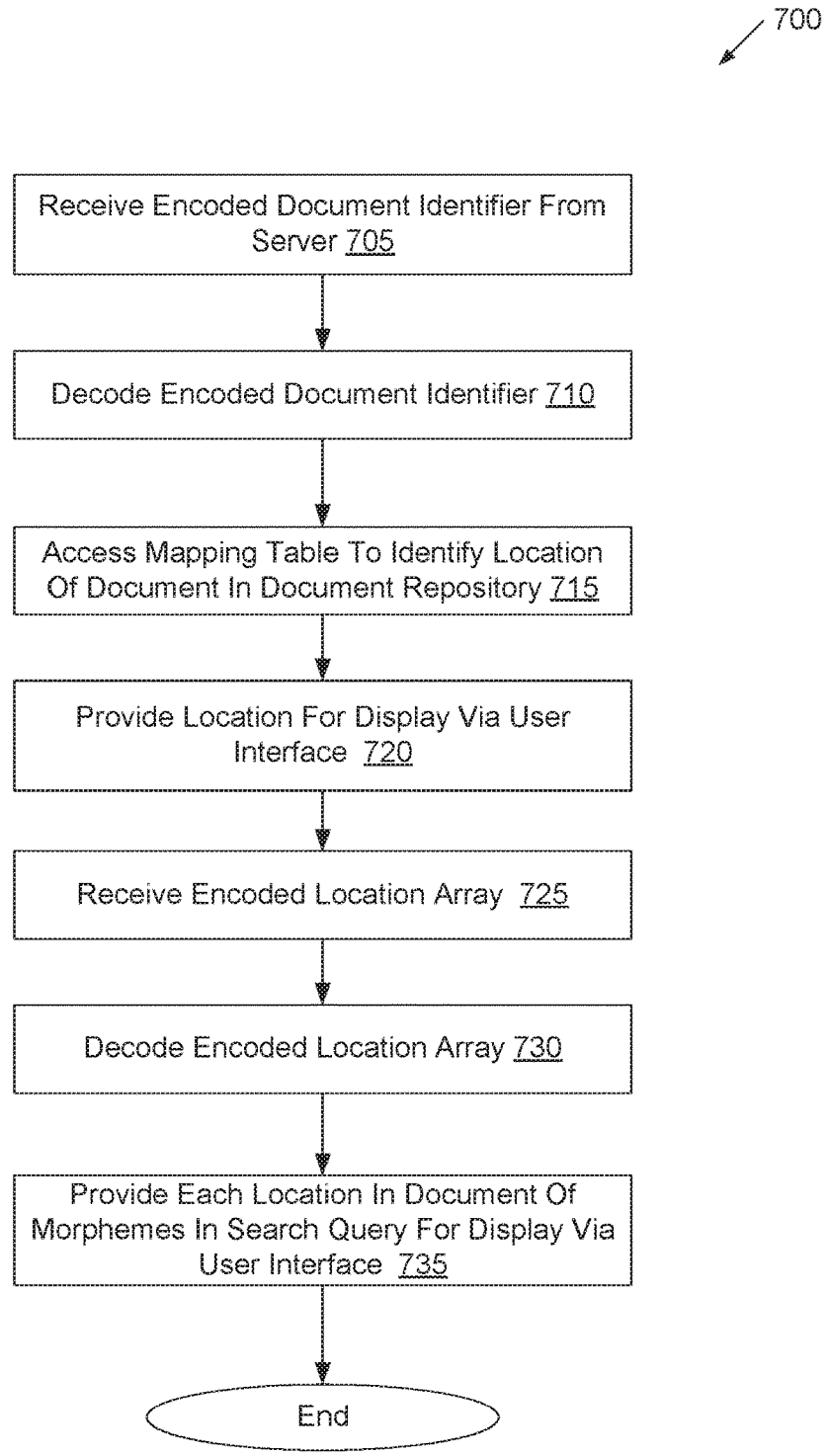
FIG. 7 is a flow diagram illustrating a method of receiving the results of a query sent to an encoded search engine, according to an embodiment.

FIG. 7 is a flow diagram illustrating an embodiment for a method 700 of receiving the results of a query sent to an encoded search engine. Method 700 may be performed, for example, by a document manager. At block 705 of method 700, processing logic receives a first encoded document identifier from the server device, wherein the first encoded document identifier is associated with the one or more encoded morphemes. At block 710, processing logic decodes the first encoded document identifier to generate a first document identifier. At block 715, processing logic accesses a mapping table using the first document identifier to identify a first location of a first document in a first document repository. At block 720, processing logic provides the first location for display via a user interface on the client device.

At block 725, processing logic receives a first encoded location array comprising each location in the first document of the one or more morphemes of the search query. At block 730, processing logic decodes the first encoded location array to generate a first location array. At block 735, processing logic provides, using the first location array, each location in the first document of the one or more morphemes of the search query for display via the user interface. After block 735, the method of FIG. 7 terminates.

Figure 8:
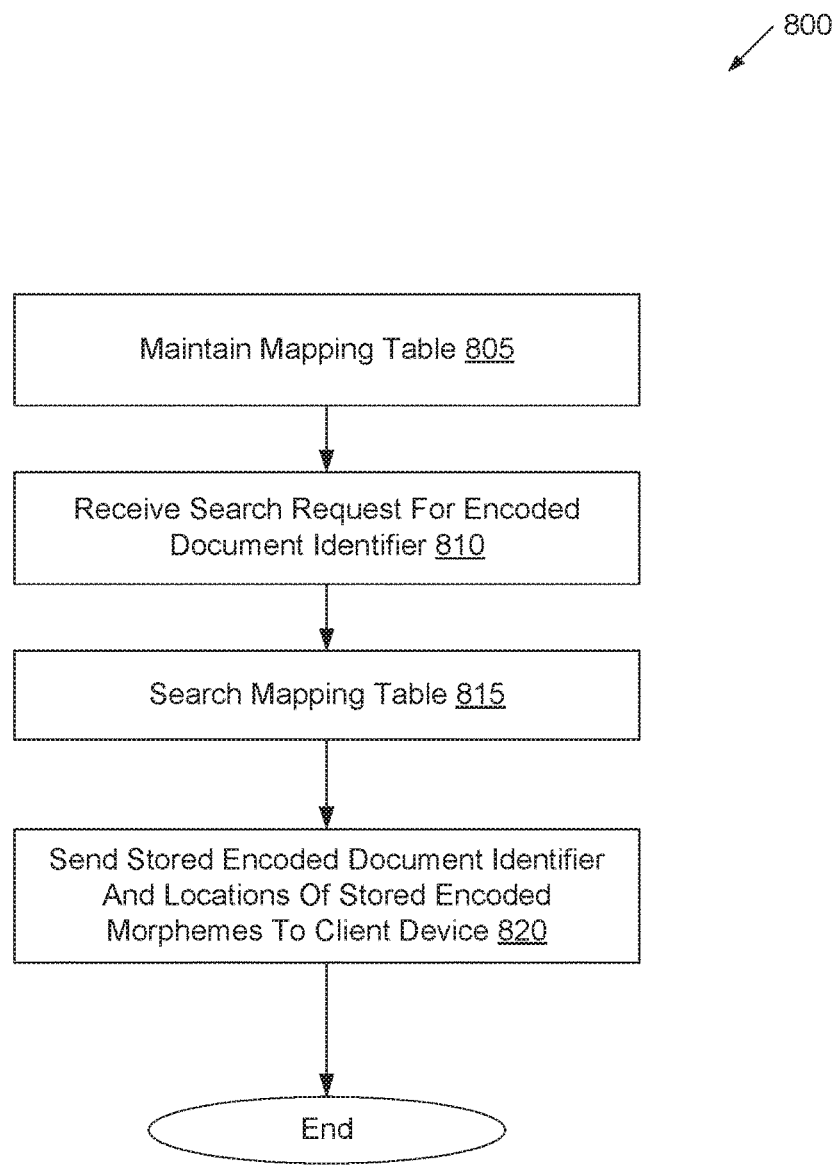
FIG. 8 is a flow diagram illustrating a method of providing a zero knowledge search engine, according to an embodiment.

FIG. 8 is a flow diagram illustrating an embodiment for a method 800 of providing a zero knowledge search engine. Method 800 may be performed, for example, by an encoded search engine. At block 805 of method 800, processing logic maintains a mapping table comprising entries that are each associated with one of a plurality of encoded morphemes of a document. In some implementations, each entry in the mapping table indicates a location of a stored encoded morpheme in the document and maps the stored encoded morpheme to a stored encoded document identifier of the document, where the stored encoded morpheme and the stored encoded document identifier were encoded using an encryption passphrase associated with a client device.

At block 810, processing logic receives a search request for an encoded document identifier from the client device, wherein the search request comprises a first received encoded morpheme and a second received encoded morpheme in a first order. At block 815, processing logic searches the mapping table for entries that include a first stored encoded morpheme that matches the first received encoded morpheme and a second stored encoded morpheme that matches the second received encoded morpheme, where the first stored encoded morpheme and the second stored encoded morpheme each map to the same stored encoded document identifier, and where the locations of the first stored encoded morpheme and the second stored encoded morpheme match the first order from block 810.

At block 820, processing logic sends the stored encoded document identifier and the locations of the first stored encoded morpheme and the second stored encoded morpheme that match the first order to the client device in response to the search request. After block 820, the method of FIG. 8 terminates.

Figure 9:
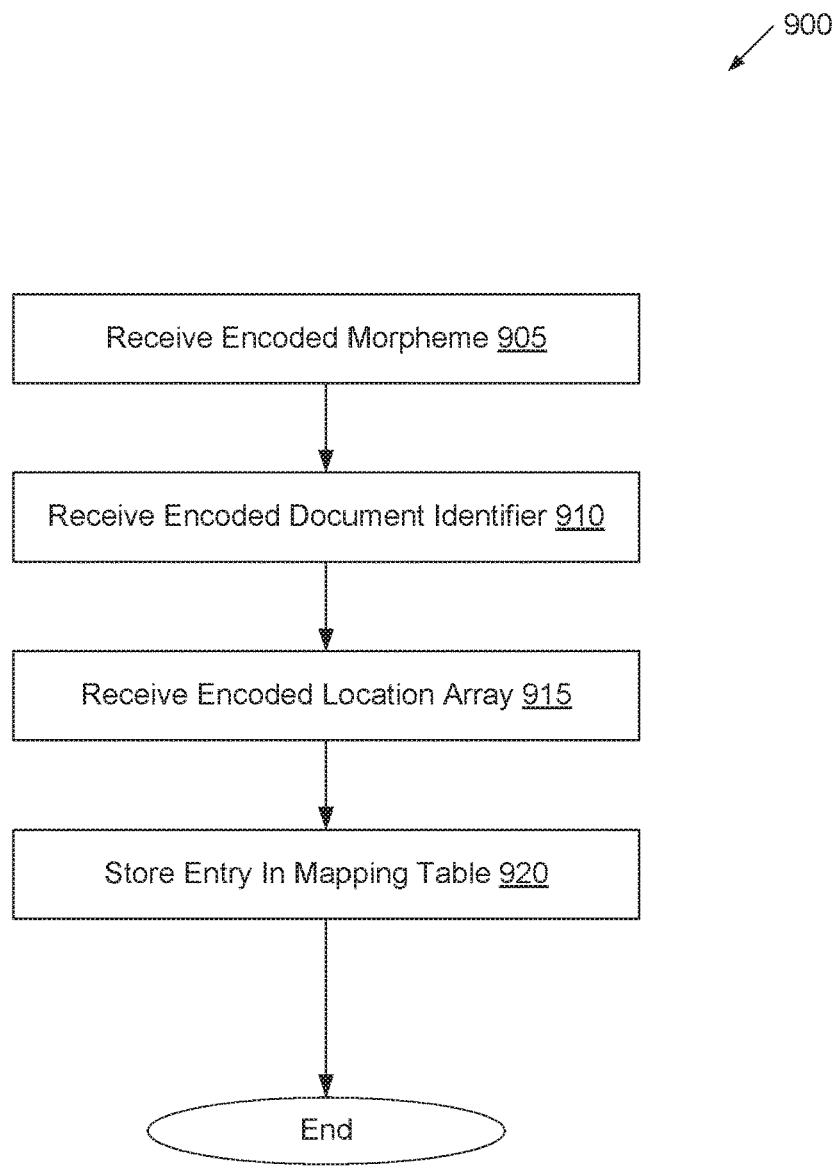
FIG. 9 is a flow diagram illustrating a method of maintaining a mapping table by an encoded search engine, according to an embodiment.

FIG. 9 is a flow diagram illustrating an embodiment for a method 900 of maintaining a mapping table by an encoded search engine. Method 900 may be performed, for example, by an encoded search engine. At block 905 of method 900, processing logic receives an encoded morpheme from a client device. At block 910, processing logic receives, from the client device, an encoded document identifier associated with the encoded morpheme. At block 915, processing logic receives, from the client device, an encoded location array comprising each occurrence within the document of the morpheme associated with the encoded morpheme. At block 920, processing logic stores an entry in the mapping table that associates the encoded morpheme, the encoded document identifier, and the encoded location array. After block 920, the method of FIG. 9 terminates.

Figure 10:
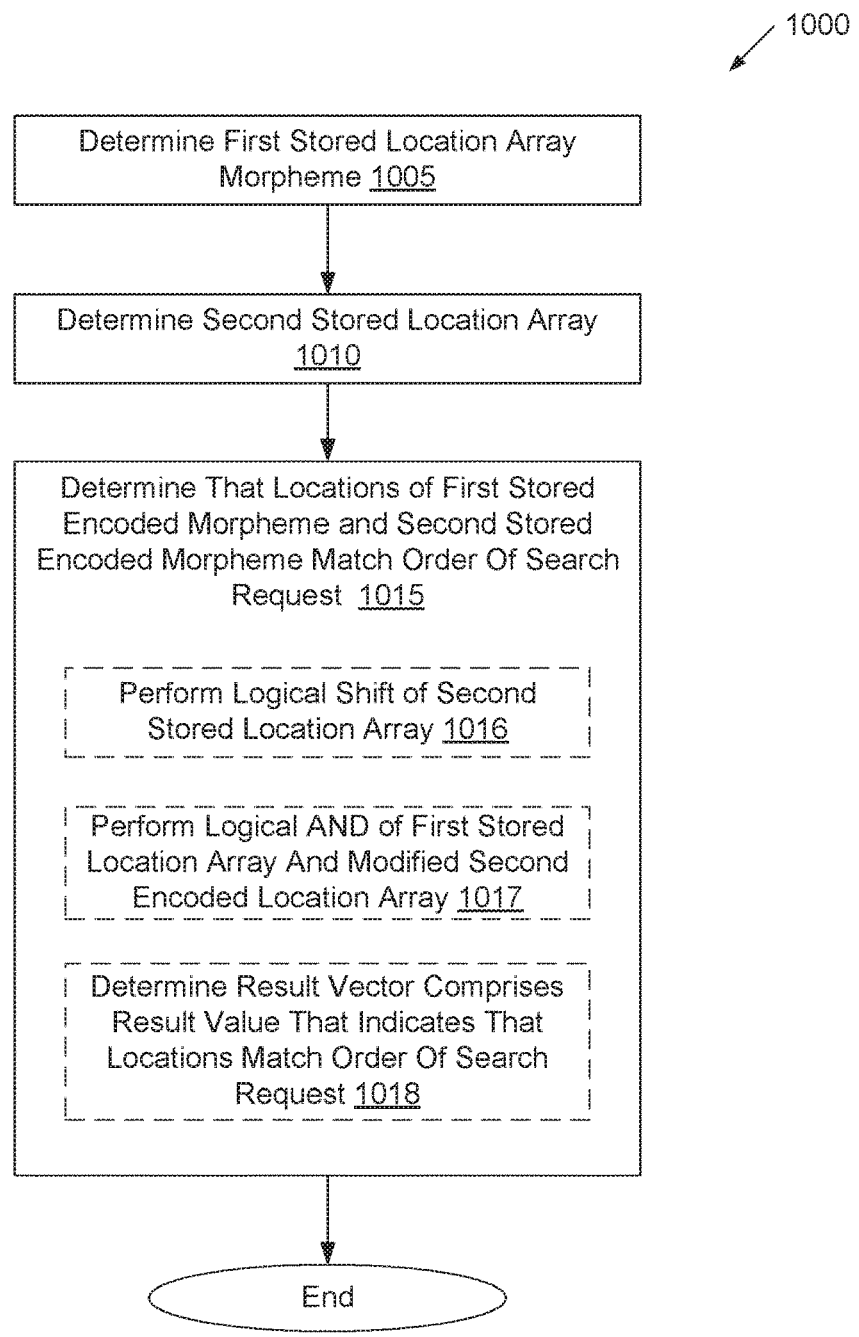
FIG. 10 is a flow diagram illustrating a method of determining that the location of encoded morphemes matches the order of morphemes in a search request, according to an embodiment.

FIG. 10 is a flow diagram illustrating an embodiment for a method 1000 of determining that the location of encoded morphemes matches the order of morphemes in a search request. Method 1000 may be performed, for example, by an encoded search engine. At block 1005 of method 1000, processing logic determines a first stored encoded location array associated with the first stored encoded morpheme and the same stored encoded document identifier. At block 1010, processing logic determines a second stored encoded location array associated with the second stored encoded morpheme and the same stored encoded document identifier.

At block 1015, processing logic determines, using the first stored encoded location array and the second stored encoded location array, that the locations of first stored encoded morpheme and the second stored encoded morpheme match the first order. In some implementations, this determination is made performing a logical operation on the encoded location arrays. In one embodiment, the logical operation is performed by invoking blocks 1016 through 1018.

At block 1016, processing logic performs a logical shift operation on the second stored encoded location array to generate a modified second encoded location array. At block 1017, processing logic performs a logical "AND" operation on the first stored encoded location array and the modified second encoded location array to generate a result vector. At block 1018, processing logic performs that the result vector comprises a result value that indicates that the locations of the first stored encoded morpheme and the second stored encoded morpheme match the first order. After block 1015 (or block 1018), the method of FIG. 10 terminates.

Figure 11:
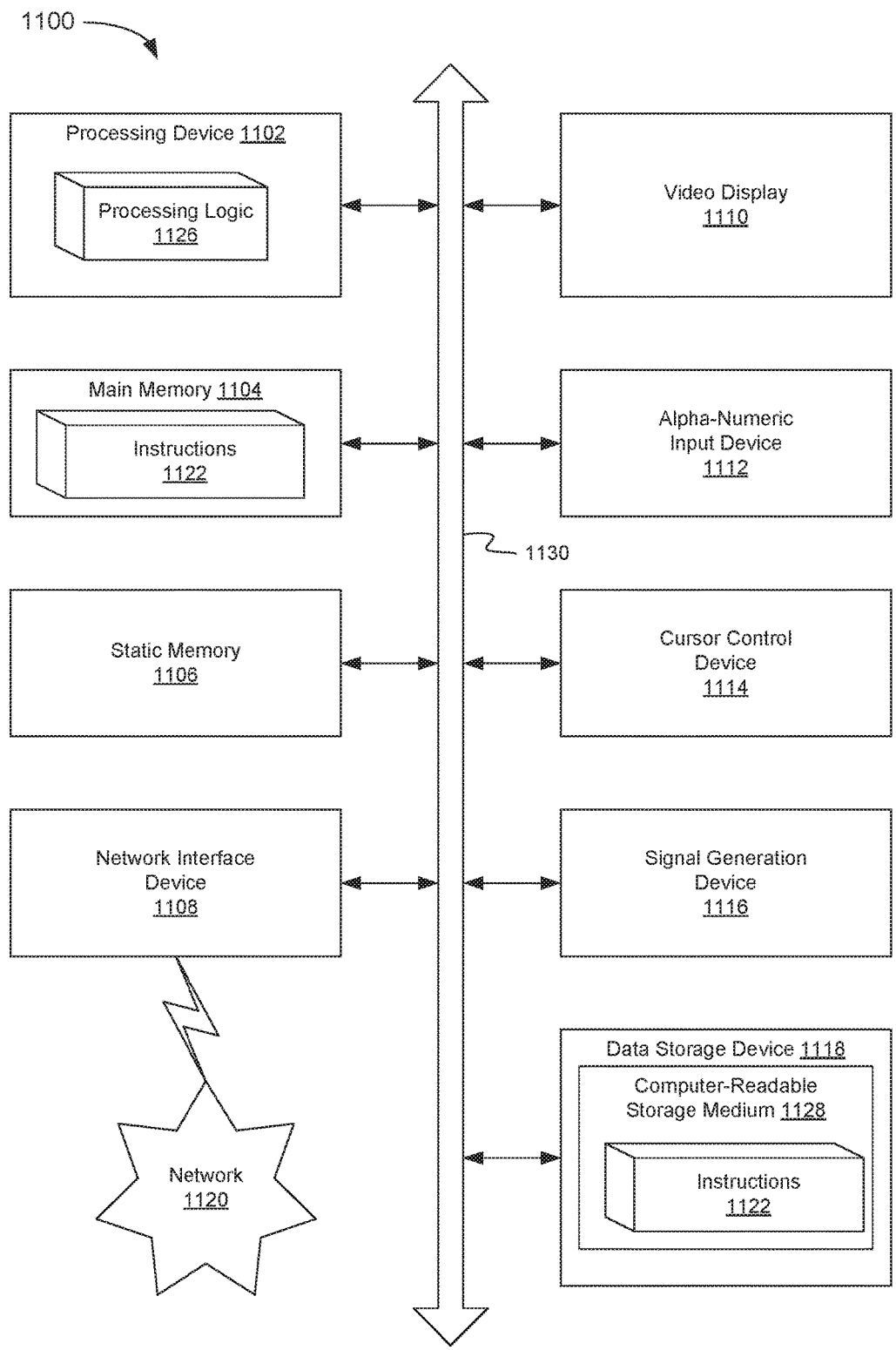
FIG. 11 is a block diagram illustrating an exemplary computer system, according to an embodiment.

FIG. 11 illustrates a diagrammatic representation of a machine in the exemplary form of a computer system 1100 within which a set of instructions, for causing the machine to perform any one or more of the methodologies discussed herein, may be executed. For example, the instructions may cause the machine to perform asynchronous scanning using redirected scanners with a single driver. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may represent client device 110 or server 140 of FIGS. 1-3.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute the processing logic 1126 for performing the operations and steps discussed herein. In one embodiment, processing logic 1126 is representative of document manager 112. In another embodiment, processing logic 726 is representative of encoded search engine 142.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of document manager 112 or encoded search engine 142) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "encoding", "determining", "receiving," "identifying," "sending," "executing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to facilitate indexing of a plurality of documents stored in a document repository, the method comprising:
    obtaining, by a processing device of a client device, a document of the plurality of documents stored in the document repository, the document comprising a plurality of morphemes;
    encoding, by the processing device, a morpheme of the plurality of morphemes using an encryption passphrase associated with the client device to generate an encoded morpheme;
    encoding, by the processing device, a location array using the encryption passphrase to generate an encoded location array, wherein the location array comprises each location of the morpheme within the document;
    encoding, by the processing device, a unique identifier associated with a location of the document in the document repository using the encryption passphrase to generate an encoded document identifier; and
    sending, by the processing device, the encoded morpheme, the encoded location array, and the encoded document identifier to a server device to be stored in a search index.

2. The method of claim 1, further comprising:
    parsing the document to extract textual content from the document, the textual content comprising a plurality of words;
    determining the morpheme from a first word of the plurality of words within the textual content;
    identifying each occurrence of the morpheme within the textual content; and determining, based on each occurrence of the morpheme, each location of the morpheme within the textual content to generate the location array for the morpheme.

3. The method of claim 1, further comprising:
generating the unique document identifier associated with the location of the document; and
storing the unique document identifier in a mapping table that maps the unique document identifier to the location of the document.

4. The method of claim 1, further comprising:
receiving a notification that the document has been modified; and
sending a request to retrieve the document from the document repository.

5. The method of claim 1, wherein at least one of the encoded morpheme, the encoded location array, and the encoded document identifier is generated using homomorphic encryption.

6. The method of claim 1, further comprising:
receiving a search query comprising one or more words, the search query to be used to search documents stored in the document repository;
determining one or more morphemes associated with the one or more words;
determining an order of the one or more morphemes within the search query;
encoding each of the one or more morphemes using the encryption passphrase to generate one or more encoded morphemes; and
sending the one or more encoded morphemes and the order of the one or more morphemes within the search query to the server device.

7. The method of claim 6, further comprising:
receiving a first encoded document identifier from the server device, wherein the first encoded document identifier is associated with the one or more encoded morphemes;
decoding the first encoded document identifier to generate a first document identifier;
accessing the mapping table using the first document identifier to identify a first location of a first document in a first document repository; and
providing the first location for display via a user interface on the client device.

8. The method of claim 7, further comprising:
receiving a first encoded location array comprising each location in the first document of the one or more morphemes of the search query;
decoding the first encoded location array to generate a first location array; and
providing, using the first location array, each location in the first document of the one or more morphemes of the search query for display via the user interface.

9. A server computing system comprising:
a memory; and
a processing device operatively coupled to the memory, the processing device to:
maintain a mapping table comprising entries that are each associated with one of a plurality of encoded morphemes of a document, wherein each entry in the mapping table indicates a location of a stored encoded morpheme in the document, and maps the stored encoded morpheme to a stored encoded document identifier of the document, wherein the stored encoded morpheme and the stored encoded document identifier were encoded using an encryption passphrase associated with a client device;
receive a search request for an encoded document identifier from the client device, wherein the search request comprises a first received encoded morpheme and a second received encoded morpheme in a first order;
searching the mapping table for entries comprising:
a first stored encoded morpheme that matches the first received encoded morpheme, and
a second stored encoded morpheme that matches the second received encoded morpheme,
wherein the first stored encoded morpheme and the second stored encoded morpheme each map to a same stored encoded document identifier, and
wherein locations of the first stored encoded morpheme and the second stored encoded morpheme match the first order; and
send the stored encoded document identifier and the locations of the first stored encoded morpheme and the second stored encoded morpheme to the client device in response to the search request, wherein the locations of the first stored encoded morpheme and the second stored encoded morpheme match the first order.

10. The server computing system of claim 9, wherein to maintain the mapping table the processing device is to:
receive, from the client device, an encoded morpheme;
receive, from the client device, an encoded document identifier associated with the encoded morpheme;
receive, from the client device, an encoded location array comprising each occurrence within the document of the morpheme associated with the encoded morpheme; and
storing an entry in the mapping table that associates the encoded morpheme, the encoded document identifier, and the encoded location array.

11. The server computing system of claim 10, wherein the processing device is further to:
determine a first stored encoded location array associated with the first stored encoded morpheme and the same stored encoded document identifier;
determine a second stored encoded location array associated with the second stored encoded morpheme and the same stored encoded document identifier; and
determining, using the first stored encoded location array and the second stored encoded location array, that the locations of first stored encoded morpheme and the second stored encoded morpheme match the first order.

12. The server computing system of claim 11, wherein the processing device is further to:
perform a logical operation on the first stored encoded location array and the second stored encoded location array; and
determine that the first stored encoded morpheme and the second stored encoded morpheme occur in the first order within the document associated with the first encoded document identifier based on the logical operation.

13. The server computing system of claim 12, wherein to perform the logical operation, the processing device is to:
perform a logical shift operation on the second stored encoded location array to generate a modified second encoded location array;
perform a logical AND operation on the first stored encoded location array and the modified second encoded location array to generate a result vector; and determining that the result vector comprises a result value that indicates that the locations of the first stored encoded morpheme and the second stored encoded morpheme match the first order.

14. A non-transitory computer readable storage medium storing instructions that, when executed by a processing device of a client device, cause the processing device to:
obtain a document of the plurality of documents stored in the document repository, the document comprising a plurality of morphemes;
encode a morpheme of the plurality of morphemes using an encryption passphrase associated with the client device to generate an encoded morpheme;
encode a location array using the encryption passphrase to generate an encoded location array, wherein the location array comprises each location of the morpheme within the document;
encode a unique identifier associated with a location of the document in the document repository using the encryption passphrase to generate an encoded document identifier; and
send the encoded morpheme, the encoded location array, and the encoded document identifier to a server device to be stored in a search index.

15. The non-transitory computer readable storage medium of claim 14, wherein the instructions further cause the processing device to:
parse the document to extract textual content from the document, the textual content comprising a plurality of words;
determine the morpheme from a first word of the plurality of words within the textual content;
identify each occurrence of the morpheme within the textual content; and
determine, based on each occurrence of the morpheme, each location of the morpheme within the textual content to generate the location array for the morpheme.

16. The non-transitory computer readable storage medium of claim 14, wherein the instructions further cause the processing device to:
generate the unique document identifier associated with the location of the document; and
store the unique document identifier in a mapping table that maps the unique document identifier to the location of the document.

17. The non-transitory computer readable storage medium of claim 14, wherein the instructions further cause the processing device to:
receive a notification that the document has been modified; and
send a request to retrieve the document from the document repository.

18. The non-transitory computer readable storage medium of claim 14, wherein at least one of the encoded morpheme, the encoded location array, and the encoded document identifier is generated using homomorphic encryption.

19. The non-transitory computer readable storage medium of claim 14, wherein the instructions further cause the processing device to:
receive a search query comprising one or more words, the search query to be used to search all documents stored in the document repository;
determine one or more morphemes associated with the one or more words;
determine an order of the one or more morphemes within the search query;
encode each of the one or more morphemes using the encryption passphrase to generate one or more encoded morphemes; and
send the one or more encoded morphemes and the order of the one or more morphemes within the search query to the server device.

20. The non-transitory computer readable storage medium of claim 19, wherein the instructions further cause the processing device to:
receive a first encoded document identifier from the server device, wherein the first encoded document identifier is associated with the one or more encoded morphemes;
decode the first encoded document identifier to generate a first document identifier;
access the mapping table using the first document identifier to identify a first location of a first document in a first document repository; and
provide the first location for display via a user interface on the client device.

21. The non-transitory computer readable storage medium of claim 20, wherein the instructions further cause the processing device to:
receive a first encoded location array comprising each location in the first document of the one or more morphemes of the search query;
decode the first encoded location array to generate a first location array; and
provide, using the first location array, each location in the first document of the one or more morphemes of the search query for display via the user interface.

\* \* \* \* \*